(12) United States Patent
Golden

(10) Patent No.: US 9,700,841 B2
(45) Date of Patent: Jul. 11, 2017

(54) SYNERGIZED PGM CLOSE-COUPLED CATALYSTS FOR TWC APPLICATIONS

(71) Applicant: Clean Diesel Technologies, Inc., Oxnard, CA (US)

(72) Inventor: Stephen J. Golden, Santa Barbara, CA (US)

(73) Assignee: BYD Company Limited, Shenzhen (CN)

(*) Notice: Subject to any disclaimer, the term of this patent is extended or adjusted under 35 U.S.C. 154(b) by 36 days.

(21) Appl. No.: 14/657,842

(22) Filed: Mar. 13, 2015

(65) Prior Publication Data
US 2016/0263526 A1   Sep. 15, 2016

(51) Int. Cl.
*B01D 50/00*   (2006.01)
*B01D 53/94*   (2006.01)
(Continued)

(52) U.S. Cl.
CPC ....... *B01D 53/945* (2013.01); *B01D 53/9477* (2013.01); *B01J 23/005* (2013.01);
(Continued)

(58) Field of Classification Search
CPC ....... B01D 2255/65; B01D 2255/20761; B01J 2523/00; B01J 2523/72; B01J 23/8892; B01J 37/03
(Continued)

(56) References Cited

U.S. PATENT DOCUMENTS

| 4,629,472 | A | 12/1986 | Haney, III et al. |
| 4,891,050 | A | 1/1990 | Bowers et al. |

(Continued)

FOREIGN PATENT DOCUMENTS

| EP | 0779095 | 6/1997 |
| EP | 0945177 | 9/1999 |

(Continued)

OTHER PUBLICATIONS

International Search Report and Written Opinion for corresponding International Application No. PCT/IB2016/051416, dated May 13, 2016.

*Primary Examiner* — Tom P Duong
(74) *Attorney, Agent, or Firm* — Alston & Bird LLP

(57) ABSTRACT

Synergized PGM catalyst converters configured as three-way catalyst (TWC) systems are disclosed. The disclosed SPGM system configurations exhibit high thermal stability, attenuated air to fuel (A/F) perturbations, enhanced TWC activity, and high catalytic conversion efficiency as a result of synergizing a low PGM loading close-coupled catalyst (CCC), with Ce-based oxygen storage, with a front spinel zone of suitable mixed metal oxide compositions acting as pre-catalyst for oxygen storage. The attenuation of A/F perturbations to lower amplitude, before exhaust gas emissions go into the standard PGM CCC, allows the system to work within a range of R values very close to the stoichiometric point for both lean and rich conditions, and high catalytic conversion efficiency in $NO_x$, CO, and HC conversions. The disclosed SPGM system configurations can be utilized in a plurality of TWC applications, such as conventional TWC systems including an optional underfloor catalyst.

13 Claims, 9 Drawing Sheets

(51) Int. Cl.
  *B01J 23/89* (2006.01)
  *B01J 23/00* (2006.01)
  *B01J 23/34* (2006.01)
  *B01J 23/46* (2006.01)
  *B01J 23/72* (2006.01)
  *F01N 3/10* (2006.01)
  *F01N 13/00* (2010.01)

(52) U.S. Cl.
  CPC ............. *B01J 23/34* (2013.01); *B01J 23/464* (2013.01); *B01J 23/72* (2013.01); *B01J 23/8986* (2013.01); *F01N 3/101* (2013.01); *F01N 13/009* (2014.06); *F01N 13/0097* (2014.06); *B01D 2255/1023* (2013.01); *B01D 2255/1025* (2013.01); *B01D 2255/2073* (2013.01); *B01D 2255/20761* (2013.01); *B01D 2255/405* (2013.01); *B01D 2258/014* (2013.01); *Y02T 10/22* (2013.01)

(58) Field of Classification Search
  USPC .................................................. 422/170, 177
  See application file for complete search history.

(56) References Cited

U.S. PATENT DOCUMENTS

| | | |
|---|---|---|
| 4,892,562 A | 1/1990 | Bowers et al. |
| 5,034,020 A | 7/1991 | Epperly et al. |
| 5,168,836 A | 12/1992 | Kraus |
| 5,203,166 A | 4/1993 | Miller |
| 5,266,083 A | 11/1993 | Peter-Hoblyn et al. |
| 5,404,841 A | 4/1995 | Valentine |
| 5,501,714 A | 3/1996 | Valentine et al. |
| 5,535,708 A | 7/1996 | Valentine |
| 5,584,894 A | 12/1996 | Peter-Hoblyn et al. |
| 5,693,106 A | 12/1997 | Peter-Hoblyn et al. |
| 5,732,548 A | 3/1998 | Peter-Hoblyn et al. |
| 5,743,922 A | 4/1998 | Peter-Hoblyn et al. |
| 5,749,928 A | 5/1998 | Epperly et al. |
| 5,809,774 A | 9/1998 | Peter-Hoblyn et al. |
| 5,809,775 A | 9/1998 | Tarabulski et al. |
| 5,819,529 A | 10/1998 | Peter-Hoblyn et al. |
| 5,868,421 A | 2/1999 | Eyrainer |
| 5,921,080 A | 7/1999 | Ulmet et al. |
| 5,924,280 A | 7/1999 | Tarabulski |
| 5,939,354 A | 8/1999 | Golden |
| 5,968,464 A | 10/1999 | Peter-Hoblyn et al. |
| 5,976,475 A | 11/1999 | Peter-Hoblyn et al. |
| 5,977,017 A | 11/1999 | Golden |
| 6,003,303 A | 12/1999 | Peter-Hoblyn et al. |
| 6,023,928 A | 2/2000 | Peter-Hoblyn et al. |
| 6,051,040 A | 4/2000 | Peter-Hoblyn et al. |
| 6,063,350 A | 5/2000 | Tarabulski et al. |
| 6,124,130 A | 9/2000 | Olson |
| 6,203,770 B1 | 3/2001 | Peter-Hoblyn et al. |
| 6,279,603 B1 | 8/2001 | Czarnik et al. |
| 6,352,955 B1 | 3/2002 | Golden |
| 6,361,754 B1 | 3/2002 | Peter-Hoblyn et al. |
| 6,372,686 B1 | 4/2002 | Golden |
| 6,531,425 B2 | 3/2003 | Golden |
| 6,948,926 B2 | 9/2005 | Valentine et al. |
| 7,014,825 B2 | 3/2006 | Golden |
| 7,473,288 B2 | 1/2009 | Toyoda et al. |
| 7,527,776 B2 | 5/2009 | Golden et al. |
| 7,641,875 B1 | 1/2010 | Golden |
| 8,323,601 B2 | 12/2012 | Justic et al. |
| 8,802,582 B2 | 8/2014 | Malyala et al. |
| 8,845,987 B1 | 9/2014 | Nazarpoor et al. |
| 8,853,121 B1 | 10/2014 | Nazarpoor et al. |
| 9,216,410 B2 | 12/2015 | Hatfield |
| 2001/0001354 A1 | 5/2001 | Peter-Hoblyn et al. |
| 2002/0001554 A1 | 1/2002 | Czarnik et al. |
| 2002/0042341 A1 | 4/2002 | Golden |
| 2003/0109047 A1 | 6/2003 | Valentine |
| 2003/0126789 A1 | 7/2003 | Valentine et al. |
| 2003/0148235 A1 | 8/2003 | Valentine et al. |
| 2003/0185722 A1 | 10/2003 | Toyoda |
| 2003/0198582 A1 | 10/2003 | Golden |
| 2004/0098905 A1 | 5/2004 | Valentine et al. |
| 2004/0172876 A1 | 9/2004 | Sprague et al. |
| 2005/0132674 A1 | 6/2005 | Toyoda et al. |
| 2005/0160663 A1 | 7/2005 | Valentine |
| 2005/0160724 A1 | 7/2005 | Valentine et al. |
| 2005/0164139 A1 | 7/2005 | Valentine et al. |
| 2005/0188605 A1 | 9/2005 | Valentine et al. |
| 2005/0217751 A1 | 10/2005 | Valentine et al. |
| 2006/0081922 A1 | 4/2006 | Golden |
| 2006/0120936 A1 | 6/2006 | Alive et al. |
| 2006/0166816 A1 | 7/2006 | Zhang et al. |
| 2006/0228283 A1 | 10/2006 | Malyala et al. |
| 2006/0254535 A1 | 11/2006 | Valentine et al. |
| 2006/0260185 A1 | 11/2006 | Valentine et al. |
| 2007/0015656 A1 | 1/2007 | Valentine et al. |
| 2007/0209272 A1 | 9/2007 | Valentine |
| 2007/0283681 A1 | 12/2007 | Makkee et al. |
| 2008/0210184 A1 | 9/2008 | Valentine et al. |
| 2008/0226524 A1 | 9/2008 | Alive et al. |
| 2009/0004083 A1 | 1/2009 | Valentine et al. |
| 2009/0304566 A1 | 12/2009 | Golden et al. |
| 2009/0324468 A1 | 12/2009 | Golden et al. |
| 2009/0324469 A1 | 12/2009 | Golden et al. |
| 2010/0240525 A1 | 9/2010 | Golden et al. |
| 2010/0316545 A1 | 12/2010 | Alive et al. |
| 2010/0316547 A1 | 12/2010 | Justice et al. |
| 2011/0239626 A1 | 10/2011 | Makkee et al. |
| 2012/0183447 A1 | 7/2012 | Kwan et al. |
| 2013/0115144 A1 | 5/2013 | Golden et al. |
| 2013/0236380 A1 | 9/2013 | Golden et al. |
| 2014/0271384 A1 | 9/2014 | Nazarpoor et al. |
| 2014/0271387 A1 | 9/2014 | Nazarpoor |
| 2014/0271388 A1* | 9/2014 | Nazarpoor ........... B01J 23/8892 422/170 |
| 2014/0271390 A1 | 9/2014 | Nazarpoor |
| 2014/0271391 A1 | 9/2014 | Nazarpoor |
| 2014/0271392 A1 | 9/2014 | Nazarpoor |
| 2014/0271393 A1 | 9/2014 | Nazarpoor |
| 2014/0271425 A1 | 9/2014 | Nazarpoor |
| 2014/0274662 A1 | 9/2014 | Nazarpoor |
| 2014/0274663 A1 | 9/2014 | Nazarpoor |
| 2014/0274674 A1 | 9/2014 | Nazarpoor et al. |
| 2014/0274675 A1 | 9/2014 | Nazarpoor |
| 2014/0274677 A1 | 9/2014 | Nazarpoor |
| 2014/0274678 A1 | 9/2014 | Nazarpoor |
| 2014/0298714 A1 | 10/2014 | Sprague |
| 2014/0301906 A1 | 10/2014 | Hatfield |
| 2014/0301909 A1 | 10/2014 | Nazarpoor |
| 2014/0301926 A1 | 10/2014 | Hatfield |
| 2014/0301931 A1 | 10/2014 | Nazarpoor |
| 2014/0302983 A1 | 10/2014 | Nazarpoor |
| 2014/0334978 A1 | 11/2014 | Hatfield |
| 2014/0334989 A1 | 11/2014 | Nazarpoor et al. |
| 2014/0334990 A1 | 11/2014 | Nazarpoor |
| 2014/0335625 A1 | 11/2014 | Hatfield |
| 2014/0335626 A1 | 11/2014 | Hatfield |
| 2014/0336038 A1 | 11/2014 | Nazarpoor et al. |
| 2014/0336044 A1 | 11/2014 | Nazarpoor et al. |
| 2014/0336045 A1 | 11/2014 | Nazarpoor et al. |
| 2014/0356243 A1 | 12/2014 | Nazarpoor |
| 2014/0357475 A1 | 12/2014 | Nazarpoor et al. |
| 2014/0357479 A1 | 12/2014 | Nazarpoor et al. |
| 2014/0360164 A1 | 12/2014 | Sprague et al. |
| 2014/0364303 A1 | 12/2014 | Hatfield |
| 2015/0004709 A1 | 1/2015 | Nazarpoor |
| 2015/0005157 A1 | 1/2015 | Nazarpoor et al. |
| 2015/0005158 A1 | 1/2015 | Nazarpoor |
| 2015/0005159 A1 | 1/2015 | Nazarpoor et al. |
| 2015/0017082 A1 | 1/2015 | Nazarpoor |
| 2015/0018202 A1 | 1/2015 | Nazarpoor et al. |
| 2015/0018203 A1 | 1/2015 | Nazarpoor et al. |
| 2015/0018204 A1 | 1/2015 | Nazarpoor et al. |
| 2015/0018205 A1 | 1/2015 | Nazarpoor et al. |
| 2015/0031268 A1 | 1/2015 | Waites et al. |
| 2015/0050742 A1 | 2/2015 | Nazarpoor |

(56) References Cited

U.S. PATENT DOCUMENTS

| | | |
|---|---|---|
| 2015/0051067 A1 | 2/2015 | Nazarpoor et al. |
| 2015/0105242 A1 | 4/2015 | Nazarpoor et al. |
| 2015/0105243 A1 | 4/2015 | Nazarpoor et al. |
| 2015/0105245 A1 | 4/2015 | Nazarpoor et al. |
| 2015/0105246 A1 | 4/2015 | Nazarpoor et al. |
| 2015/0105247 A1 | 4/2015 | Nazarpoor et al. |
| 2015/0147239 A1 | 5/2015 | Launois et al. |
| 2015/0147251 A1 | 5/2015 | Nazarpoor et al. |
| 2015/0148215 A1 | 5/2015 | Nazarpoor |
| 2015/0148216 A1 | 5/2015 | Nazarpoor et al. |
| 2015/0148220 A1 | 5/2015 | Nazarpoor |
| 2015/0148222 A1 | 5/2015 | Nazarpoor |
| 2015/0148223 A1 | 5/2015 | Nazarpoor et al. |
| 2015/0148224 A1 | 5/2015 | Nazarpoor et al. |
| 2015/0148225 A1 | 5/2015 | Nazarpoor et al. |
| 2015/0182951 A1 | 7/2015 | Nazarpoor et al. |
| 2015/0182954 A1 | 7/2015 | Nazarpoor et al. |
| 2015/0196902 A1 | 7/2015 | Golden et al. |
| 2015/0238940 A1 | 8/2015 | Nazarpoor et al. |
| 2015/0238941 A1 | 8/2015 | Nazarpoor et al. |
| 2015/0258496 A1 | 9/2015 | Hatfield et al. |
| 2015/0290627 A1 | 10/2015 | Nazarpoor et al. |
| 2015/0290630 A1 | 10/2015 | Nazarpoor et al. |
| 2015/0316524 A1 | 11/2015 | Hatfield |
| 2015/0352494 A1 | 12/2015 | Hatfield et al. |
| 2015/0352529 A1 | 12/2015 | Nazarpoor et al. |
| 2015/0352531 A1 | 12/2015 | Hatfield et al. |
| 2015/0352532 A1 | 12/2015 | Hatfield et al. |
| 2015/0352533 A1 | 12/2015 | Hatfield et al. |
| 2016/0023188 A1 | 1/2016 | Nazarpoor et al. |
| 2016/0030885 A1 | 2/2016 | Hatfield |
| 2016/0047751 A1 | 2/2016 | Pless et al. |
| 2016/0082422 A1 | 3/2016 | Nazarpoor et al. |
| 2016/0121304 A1 | 5/2016 | Nazarpoor et al. |
| 2016/0121308 A1 | 5/2016 | Nazarpoor et al. |
| 2016/0121309 A1 | 5/2016 | Nazarpoor et al. |
| 2016/0136617 A1 | 5/2016 | Nazarpoor et al. |
| 2016/0136618 A1 | 5/2016 | Nazarpoor et al. |
| 2016/0136619 A1 | 5/2016 | Nazarpoor et al. |
| 2016/0136620 A1 | 5/2016 | Nazarpoor et al. |
| 2016/0136621 A1 | 5/2016 | Nazarpoor et al. |
| 2016/0167023 A1 | 6/2016 | Nazarpoor et al. |
| 2016/0167024 A1 | 6/2016 | Nazarpoor et al. |
| 2016/0263526 A1 | 9/2016 | Golden |
| 2016/0263561 A1 | 9/2016 | Nazarpoor et al. |
| 2016/0312730 A1 | 10/2016 | Launois et al. |
| 2016/0346765 A1 | 12/2016 | Nazarpoor et al. |
| 2016/0354765 A1 | 12/2016 | Hatfield et al. |
| 2016/0361710 A1 | 12/2016 | Nazarpoor et al. |
| 2016/0361711 A1 | 12/2016 | Nazarpoor et al. |

FOREIGN PATENT DOCUMENTS

| | | |
|---|---|---|
| WO | WO 90/07561 | 7/1990 |
| WO | WO 94/11467 | 5/1994 |
| WO | WO 95/02655 | 1/1995 |
| WO | WO 97/04045 | 2/1997 |
| WO | WO 97/09523 | 3/1997 |
| WO | WO 97/28358 | 8/1997 |
| WO | WO 97/36676 | 10/1997 |
| WO | WO 98/22209 A1 | 5/1998 |
| WO | WO 98/28070 A1 | 7/1998 |
| WO | WO 00/30739 A1 | 6/2000 |
| WO | WO 00/75643 A1 | 12/2000 |
| WO | WO 01/8587 A1 | 11/2001 |
| WO | WO 03/068363 A1 | 8/2003 |
| WO | WO 2004/058641 A1 | 7/2004 |
| WO | WO 2009/139860 A1 | 11/2009 |
| WO | WO 2011/068509 A1 | 6/2011 |
| WO | WO 2014/194101 A1 | 12/2014 |
| WO | WO 2015/081156 | 6/2015 |
| WO | WO 2015/199687 A1 | 12/2015 |
| WO | WO 2015/199688 A1 | 12/2015 |
| WO | WO 2016/039747 A1 | 3/2016 |
| WO | WO 2016203371 | 12/2016 |

* cited by examiner

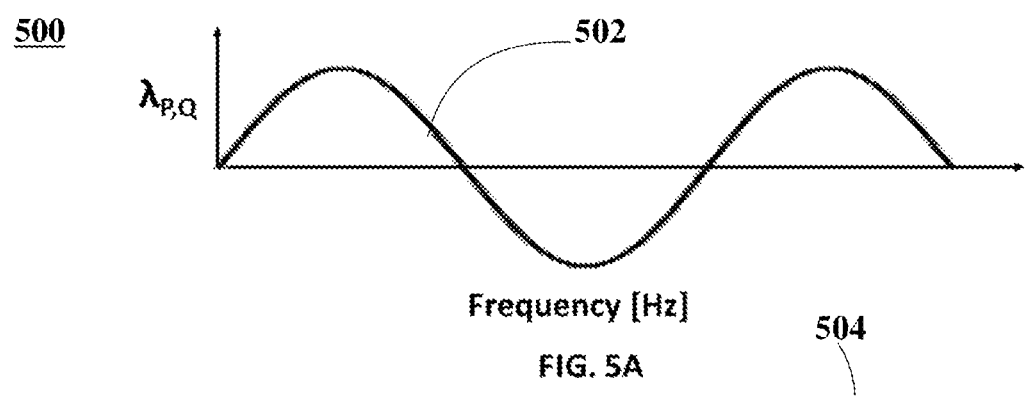
FIG. 5A
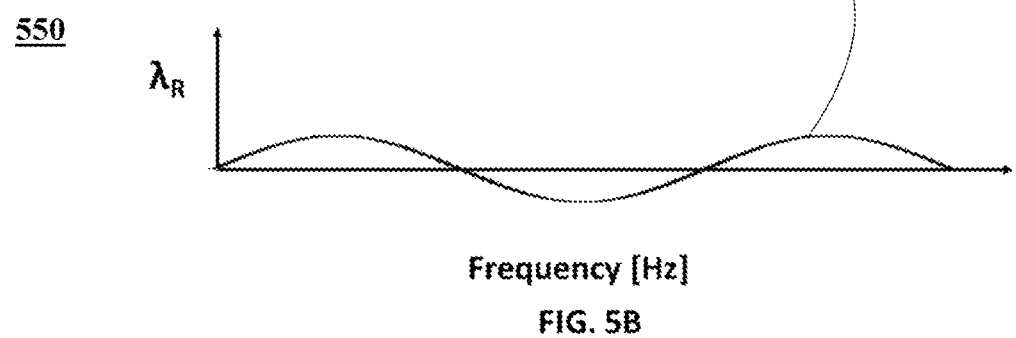
FIG. 5B
FIG. 5

SYNERGIZED PGM CLOSE-COUPLED CATALYSTS FOR TWC APPLICATIONS

BACKGROUND

Field of the Disclosure

This disclosure relates generally to catalyst materials for three-way catalyst (TWC) applications, and more particularly, to a synergized platinum group metal (PGM) TWC catalyst configuration for reduction of emissions from engine exhaust systems.

Background Information

The efficiency of a three-way catalyst (TWC) converter for treating the exhaust gas of an engine is affected by the ratio of air to fuel (A/F) supplied to the engine. At stoichiometric A/F ratio, combustion can yield complete consumption of the fuel because catalytic conversion efficiency is high for both oxidation and reduction conversions. Maintenance of effective fuel consumption requires the utilization of fuel control systems that are designed to keep the A/F ratio within a narrow range that is close to the stoichiometric ratio. The fluctuations of the A/F ratio are called A/F perturbations.

Standard TWC Systems

FIG. 1 is a block diagram illustrating a conventional Three Way Catalyst (TWC) system portion of an engine system that includes a standard platinum group metals (PGM) close-coupled catalyst (CCC) having PGM and Ce-based oxygen storage and an PGM underfloor catalyst. In FIG. 1, engine system 100 includes engine 104 and TWC system 110. TWC system 110 further includes standard PGM CCC 102, PGM underfloor catalyst 106, and analysis point P 108. In FIG. 1, engine 104 is mechanically coupled to and in fluidic communication with TWC system 110. In TWC system 110, standard PGM CCC 102 is mechanically coupled to and in fluidic communication with PGM underfloor catalyst 106.

In FIG. 1, point P 108 is located at the inlet port of standard PGM CCC 102. At point P 108, air to fuel (A/F) perturbations are generated when the initial lean interval of an A/F ratio is greater than the stoichiometric value. This initial lean interval is followed by a series of rich intervals of A/F ratio that are lower than the stoichiometric value. The series of rich intervals of A/F ratios alternate with lean intervals of A/F ratios because the engine control system is reacting to exhaust gas sensors (not shown) located prior to TWC system.

In conventional TWC systems, an efficiency value for the catalytic conversion capability of standard PGM CCC 102 is determined on the basis of the number of the A/F perturbations following the initial lean interval. Since the A/F perturbations typically possess high amplitudes at low frequencies at analysis point P 108, the catalytic conversion efficiency of standard PGM CCC 102 is affected by these wide swings in A/F ratio from engine 104.

Accordingly, there is a need for TWC systems having improved performance meeting stringent governmental regulations for automotive exhaust systems. There is also a need to do so in a cost-effective manner.

SUMMARY

The present disclosure describes three-way catalyst (TWC) system configurations for synergized platinum group metals (SPGM) catalyst systems.

In some embodiments, a TWC system is configured to include: an SPGM system having a front spinel zone acting as a pre-catalyst, which is intended to increase the oxygen storage function of the SPGM system as a pre-oxygen storage material, and a standard close-coupled catalyst (CCC) containing platinum group metals (PGM) and Ce-based oxygen storage material; and an underfloor or cleanup catalyst including PGM material. In further embodiments, the TWC system is configured to include an SPGM system having a front spinel zone acting as a pre-catalyst, which again is intended to increase the oxygen storage function of the SPGM system as a pre-oxygen storage material, and a standard close-coupled catalyst (CCC) including PGM and Ce-based oxygen storage material.

In these embodiments, the front spinel zone attenuates the air/fuel (A/F) ratio oscillations into low amplitude A/F ratio oscillations measured at the output of the front spinel zone, prior to reaching the standard CCC. The attenuation of the A/F ratio oscillations illustrates the effect of the front spinel zone upon the standard CCC as the catalytic conversion efficiency of the standard CCC is significantly enhanced, even when compared to a standard CCC containing low PGM loading. Further to these embodiments, the front spinel zone can be produced including a plurality of binary spinel compositions. Examples of suitable materials that these binary spinel structures can be produced from are aluminum, magnesium, manganese, gallium, nickel, copper, silver, cobalt, iron, chromium, titanium, tin, or mixtures thereof. Still further to these embodiments, the front spinel zone is implemented as a coating of about one or two inches produced by employing any of the conventional synthesis methods, using a formulation that can provide a spinel material composition of significant thermal stability. In an exemplary embodiment, the front spinel zone comprises a Cu—Mn spinel structure.

In some embodiments, the lambda oscillation waveforms of the A/F ratio illustrate the synergistic effect of the disclosed TWC systems including the front spinel zone and the standard CCC.

In other embodiments, SPGM system samples are produced using variations of PGM loadings for the standard CCC. The SPGM system samples include, but are not limited to, combinations of PGM material compositions of palladium (Pd) and rhodium (Rh), or Pd alone. In these embodiments, the CCC in the disclosed SPGM systems is configured to include a layer of PGM catalyst material and Ce-based oxygen storage material. In an exemplary embodiment, the front spinel zone is produced using Cu and Mn solutions of suitable loadings for a binary spinel of high thermal stability, which can be synthesized using any of the conventional chemical techniques and subsequently coated on the CCC.

In some embodiments, the plurality of catalyst samples prepared includes, but is not limited to, CCC samples including loadings of 6 g/ft3 of Pd and 6 g/ft3 of Rh; CCC samples including loadings of 12 g/ft3 of Pd and 6 g/ft3 of Rh; and CCC samples including loading of 20 g/ft3 of Pd.

In some embodiments, the front spinel zone material is coated onto the CCC in varying amounts to produce several weight ratios expressed as the mass of the front spinel zone as compared to the total mass of the front spinel zone and the CCC. In these embodiments, samples are produced for each of the PGM loadings in the CCC samples, as previously described, with weight ratios of 60% front spinel zone and 40% PGM, herein referred as SPGM systems Type 1A, Type 2A, and Type 3A, respectively, and weight ratios of 40% front spinel zone and 60% PGM, herein referred as SPGM systems Type 1B, Type 2B, and Type 3B, respectively.

Further to these embodiments, reference samples are produced for catalytic conversion comparisons and to ascertain the significant catalytic conversion efficiency of the disclosed SPGM systems. The reference samples produced include, but are not limited to, sample configurations of 60% by weight of a blank front zone and 40% by weight of CCC samples including the plurality of the aforementioned PGM loadings, herein referred as CCC reference samples Type 1C, Type 2C, and Type 3C, respectively; 40% by weight of a blank front zone and 60% by weight of CCC samples including the plurality of the aforementioned PGM loadings, herein referred as CCC reference samples Type 1D, Type 2D, and Type 3D, respectively; 100% by weight of CCC samples including the plurality of the aforementioned PGM loadings, herein referred as CCC reference samples Type 1E, Type 2E, and Type 3E, respectively; and 100% of Zero-PGM catalyst sample including a Cu—Mn spinel, herein referred as ZPGM reference samples Type 1, respectively.

In some embodiments, the synergistic effect of the front spinel zone and the catalytic performance of the disclosed catalyst system configuration are tested and compared to all other variations of catalyst system samples produced. In these embodiments, testing is conducted by performing a series of isothermal oscillating tests using a simulated exhaust of standard TWC gas composition which is fed into a test reactor at an isothermal temperature of about 550° C., under a frequency of about 0.125 Hz, with about ±0.8 A/F ratio span.

In these embodiments, the lambda oscillation illustrates the effect of catalytic conversion efficiency upon CO and HC conversions, as well as NO oxidation-reduction conversion. Further to these embodiments, catalytic conversion efficiency is illustrated for when the front spinel zone is not included with the standard CCC. Depending on the level of catalytic conversion efficiency, an underfloor or clean-up catalyst including PGM can be included as a component of an exhaust system having any of the synergized PGM close-coupled catalyst configurations disclosed. However, the enhanced and significant catalytic conversion efficiency of the disclosed SPGM system configurations and the provided attenuation of the A/F ratio perturbations allow for the exclusion of the underfloor or clean-up catalyst from conventional TWC systems.

Numerous other aspects, features and benefits of the present disclosure may be made apparent from the following detailed description taken together with the drawing figures.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

FIG. 5 is a graphical representation illustrating the lambda oscillation waveforms of the A/F perturbations at specific points prior to the exhaust gas emissions entering (FIG. 5A) a front spinel zone and then after the exhaust gas emissions leave the front spinel zone (FIG. 5B) before reaching the standard PGM CCC, according to an embodiment.

FIG. 5A is a graphical representation illustrating the lambda oscillation waveforms of the A/F perturbations at point Q of the exemplary SPGM TWC system of FIG. 4 prior to the exhaust gas emissions entering the front spinel zone, according to an embodiment.

FIG. 5B is a graphical representation illustrating the lambda oscillation waveforms of the A/F perturbations at point R of the exemplary SPGM TWC system of FIG. 4 after the exhaust gas emissions leave the front spinel zone and prior to the exhaust gas emissions reaching the standard CCC, according to an embodiment.

DETAILED DESCRIPTION

Figure 1:
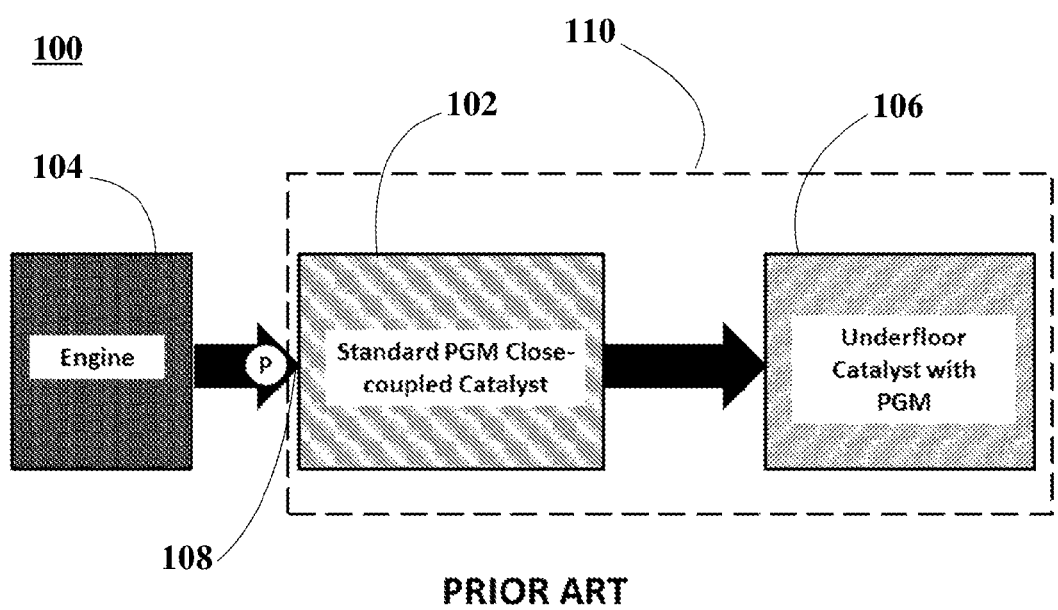
FIG. 1 is a block diagram illustrating a conventional three-way catalyst (TWC) system portion of an engine system that includes a standard platinum group metals (PGM) close-coupled catalyst (CCC) having PGM and Ce-based oxygen storage and a PGM underfloor catalyst.

The present disclosure is described herein in detail with reference to embodiments illustrated in the drawings, which form a part hereof. Other embodiments may be used and/or other modifications may be made without departing from the scope or spirit of the present disclosure. The illustrative embodiments described in the detailed description are not meant to be limiting of the subject matter presented.

DEFINITIONS

As used here, the following terms have the following definitions:

"Catalyst" refers to one or more materials that may be of use in the conversion of one or more other materials.

"Platinum group metals (PGM)" refers to platinum, palladium, ruthenium, iridium, osmium, and rhodium.

"Zero PGM (ZPGM) catalyst" refers to a catalyst completely or substantially free of platinum group metals.

"Synergized PGM (SPGM) catalyst" refers to a PGM catalyst system which is synergized by a ZPGM compound under different configuration.

"Catalyst system" refers to any system including a catalyst, such as, a PGM catalyst or a ZPGM catalyst of at least two layers comprising a substrate, a washcoat and/or an overcoat.

"Oxygen storage material (OSM)" refers to a material that absorbs oxygen from oxygen rich gas flows and further able to release oxygen into oxygen deficient gas flows.

"Synthesis method" refers to a process by which chemical reactions occur to form a catalyst from different precursor materials.

"Three-Way Catalyst" refers to a catalyst able to perform the three simultaneous tasks of reduction of nitrogen oxides to nitrogen and oxygen, oxidation of carbon monoxide to carbon dioxide, and oxidation of unburnt hydrocarbons to carbon dioxide and water.

"Spinel" refers to any minerals of the general formulation $AB_2O_4$ where the A ion and B ion are each selected from mineral oxides, such as, magnesium, iron, zinc, manganese, aluminum, chromium, or copper, amongst others.

"Close-coupled catalyst, or close-coupled catalytic converter, or pre-cat" refers to a catalyst located in close proximity to the exhaust manifold of the engine and reduces cold-engine emissions by burning off hydrocarbons from the extra-rich mixture used to start a cold engine.

"Air/Fuel ratio or A/F ratio" refers to the mass ratio of air to fuel present in a combustion process.

"R value" refers to the value obtained by dividing the reducing potential of the catalyst by the oxidizing potential of the catalyst.

"Rich condition" refers to exhaust gas condition with an R value greater than 1.

"Lean condition" refers to exhaust gas condition with an R value less than 1.

"Lambda" refers to the ratio of (A) the ratio of the amount by weight of air divided by the amount by weight of fuel actually being fed to the engine at a point in time, to (B) the air/fuel stoichiometric ratio.

"Conversion" refers to the chemical alteration of at least one material into one or more other materials.

"Catalytic Conversion efficiency" refers to the ratio of the rate of mass removal within the catalytic converter of the particular constituent of interest to the mass flow rate of that constituent into the catalytic converter.

DESCRIPTION OF THE DRAWINGS

The present disclosure describes the components of a catalytic converter system for treating the exhaust gas of an engine. The catalytic converter system components include a synergized platinum group metals catalyst (SPGM) system configuration that optionally includes a PGM underfloor catalyst. The SPGM system configuration further includes a front spinel zone and a standard PGM close-coupled catalyst (CCC).

Configuration of a Close-Coupled PGM Catalyst with a Front Spinel Zone

Figure 2:
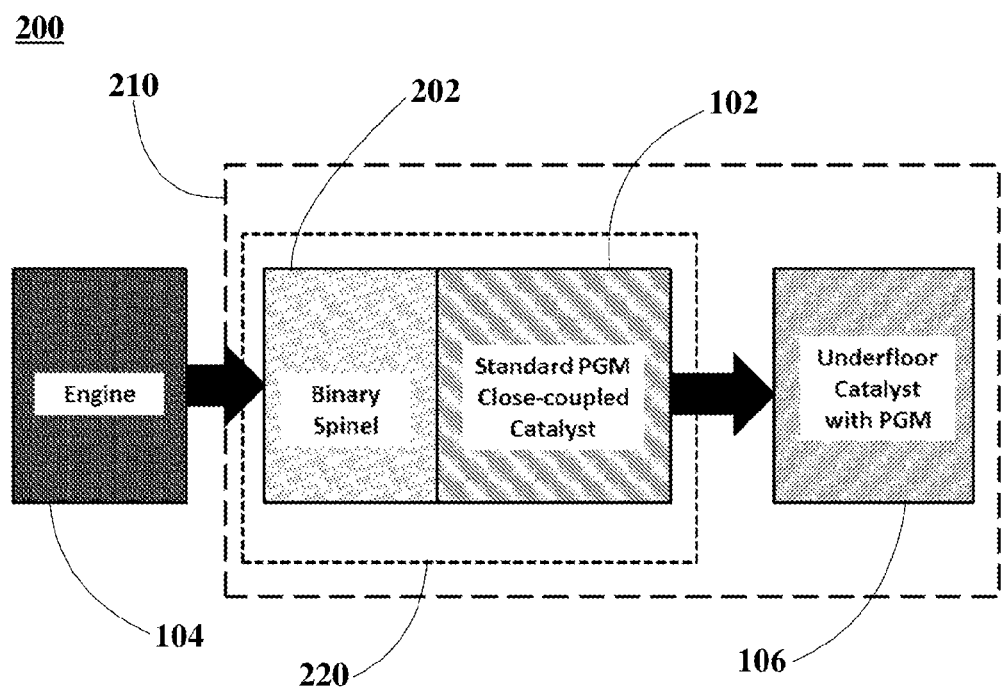
FIG. 2 is a block diagram illustrating a synergized PGM (SPGM) TWC system portion of an engine system that includes a front spinel zone and a standard PGM CCC having PGM and Ce-based oxygen storage and further including a PGM underfloor catalyst, according to an embodiment.

FIG. 2 is a block diagram illustrating a synergized platinum group metals catalyst (SPGM) Three Way Catalyst (TWC) system portion of an engine system that includes a front spinel zone and a standard PGM CCC having PGM and Ce-based oxygen storage and further including a PGM underfloor catalyst, according to an embodiment. In FIG. 2, engine system 200 includes engine 104 and SPGM TWC system 210. SPGM TWC system 210 further includes SPGM system 220 and PGM underfloor catalyst 106. SPGM system 220 includes standard PGM CCC 102 and front spinel zone 202. It should be understood that engine system 200 can include more components, less components, or different components depending on desired goals. In FIG. 2, elements having identical element numbers from previous figures perform in a substantially similar manner.

In FIG. 2, engine 104 is mechanically coupled to and in fluidic communication with SPGM TWC system 210. In SPGM TWC system 210, SPGM system 220 is mechanically coupled to and in fluidic communication with PGM underfloor catalyst 106.

In some embodiments, SPGM TWC system 210 is configured to receive exhaust gases from engine 104, process the received gases into underfloor treated exhaust gases, and expel the underfloor treated exhaust gases into the atmosphere. In these embodiments, SPGM system 220 within SPGM TWC system 210 is configured to receive exhaust gases from engine 104, process the received gases into SPGM treated gases, and expel the SPGM treated gases into PGM underfloor catalyst 106 for additional processing. Further to these embodiments, front spinel zone 202 configured to receive exhaust gases from engine 104, process the received gases into spinel treated gases, and expel the spinel treated gases into standard PGM CCC 102 for further processing.

In FIG. 2, front spinel zone 202 within SPGM system 220 comprises a mixture of metal oxides and functions as both an oxygen storage material as well as a standard pre-catalyst for standard PGM CCC 102. In some embodiments, front spinel zone 202 is manufactured using any conventional synthesis method. According to these embodiments, the front spinel zone can be formed comprising a plurality of binary spinel compositions. Examples of suitable materials that these spinel structures can contain are aluminum, magnesium, manganese, gallium, nickel, copper, silver, cobalt, iron, chromium, titanium, tin, or mixtures thereof. In exemplary embodiments, front spinel zone 202 comprises Cu—Mn spinel structures. Further to these exemplary embodiments, front spinel zone 202 is formed using Cu and Mn of suitable loadings for a Cu—Mn spinel coating of about one or two inches. In some embodiments, after formulation front spinel zone 202 is subsequently coated onto a standard PGM close-coupled catalyst, such as, for example standard PGM CCC 102.

In operation, front spinel zone 202 attenuates the air to fuel (A/F) ratio oscillations within the exhaust gases received from engine 104 into low amplitude oscillations prior to reaching standard PGM CCC 102.

In some embodiments, the attenuation of the A/F ratio oscillations has a synergistic effect upon standard PGM CCCC 102 because the catalytic conversion efficiency is significantly enhanced even for a standard PGM CCC containing low PGM loading.

Figure 3:
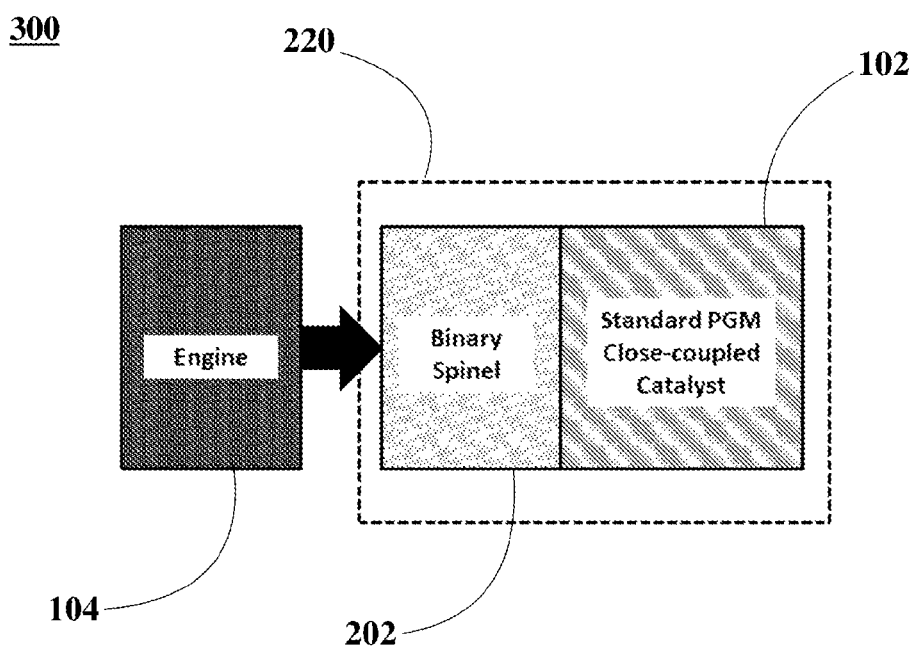
FIG. 3 is a block diagram illustrating a SPGM TWC system including a front spinel zone and a standard PGM CCC having PGM and Ce-based oxygen storage, according to an embodiment.

FIG. 3 is a block diagram illustrating a TWC system portion of an engine system that includes a front spinel zone and a standard PGM CCC having PGM and Ce-based oxygen storage, according to an embodiment. In FIG. 3, engine system 300 includes engine 104 and SPGM system 220. SPGM system 220 includes standard PGM CCC 102 and front spinel zone 202. It should be understood that engine system 300 can include more components, less components, or different components depending on desired goals. In FIG. 3, elements having identical element numbers from previous figures perform in a substantially similar manner.

In FIG. 3, engine 104 is mechanically coupled to and in fluidic communication with SPGM system 220. In some embodiments, SPGM system 220 is configured to receive exhaust gases from engine 104, process the received gases into SPGM treated gases, and expel the SPGM treated gases into the atmosphere. In these embodiments, front spinel zone 202 within SPGM system 220 is configured to receive exhaust gases from engine 104, process the received gases into spinel treated gases, and expel the spinel treated gases into standard PGM CCC 102 for further processing.

In FIG. 3, front spinel zone 202 within SPGM system 220 functions as a pre-catalyst. In this role, when implemented using a mass ratio of spinel within spinel zone 202 to PGM within standard PGM CCC 102 and a particular loading of PGM material within standard PGM CCC 102, enhanced catalytic conversion efficiency is achieved which obviates the need for an underfloor catalyst as part of the TWC system. As discussed in FIG. 2 above, in some embodiments, front spinel zone 202 attenuates the A/F ratio oscillations within the exhaust gases received from engine 104 into low amplitude oscillations prior to reaching standard PGM CCC 102. The attenuation benefits of the A/F ratio oscillations within the exhaust gases received from engine are described further in FIGS. 4, 5A, and 5B, below. The mass ratio of spinel within spinel zone 202 to PGM within standard PGM CCC 102 in conjunction with particular loadings of PGM material within standard PGM CCC 102 are described in FIGS. 6-8, below.

Figure 4:
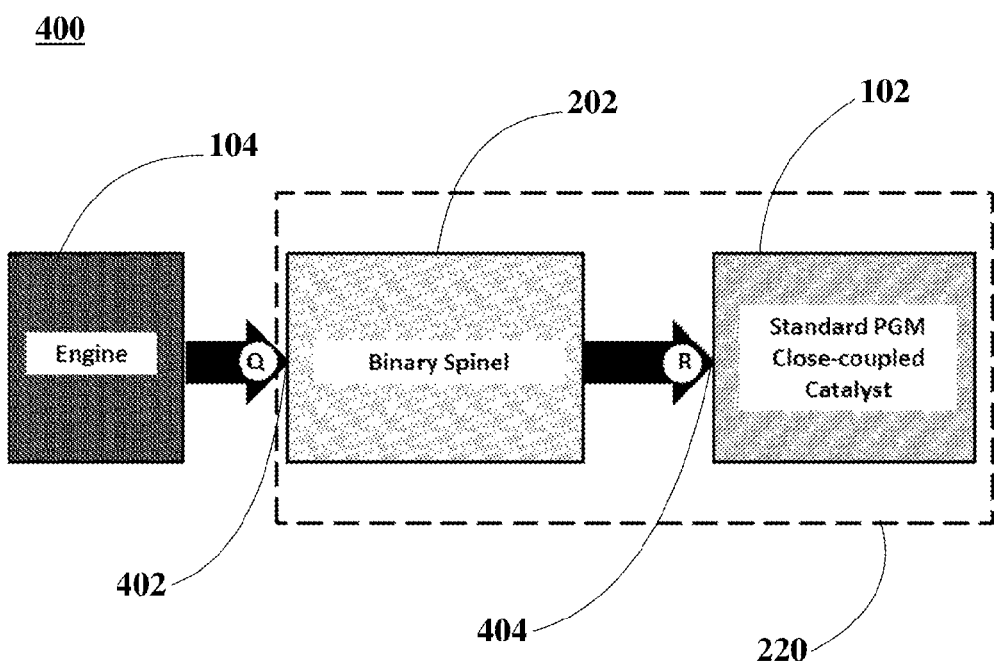
FIG. 4 is a block diagram illustrating analysis points in a SPGM TWC system including a front spinel zone and a standard PGM CCC having PGM and Ce-based oxygen storage, according to an embodiment.

FIG. 4 is a block diagram illustrating analysis points in a SPGM TWC system including a front spinel zone and a standard PGM CCC having PGM and Ce-based oxygen storage, according to an embodiment. In FIG. 4, engine system 400 includes engine 104, SPGM system 220, and analysis point Q 402. SPGM system 220 includes standard PGM CCC 102, front spinel zone 202, and analysis point R 404. It should be understood that engine system 400 can include more components, less components, or different components depending on desired goals. In FIG. 4, elements having identical element numbers from previous figures perform in a substantially similar manner.

In FIG. 4, analysis point Q 402 is located at the inlet port of front spinel zone 202 and analysis point R 404 is located the junction of the spinel material layer of front spinel zone 202 and the PGM layer of standard PGM CCC 102.

In FIG. 4, at analysis point Q 402 A/F perturbations are generated when the initial lean interval of an A/F ratio is greater than the stoichiometric value. This initial lean interval is followed by a series of rich intervals of A/F ratio that are lower than the stoichiometric value. The series of rich intervals of A/F ratios alternate with lean intervals of A/F ratios because the engine control system is reacting to exhaust gas sensors (not shown) located prior to SPGM system 220.

In FIG. 4, an efficiency value for the catalytic conversion capability of SPGM system 220 can be determined on the basis of the number of the A/F perturbations following the initial lean interval. As discussed above, at analysis point Q 402 the A/F perturbations possess high amplitudes at low frequencies. At analysis point R 404, the amplitude of the A/F perturbations are reduced due to the synergistic effects generated by front spinel zone 202. The A/F perturbations are reduced because the metal oxides of front spinel zone 202 act as a highly effective pre-oxygen storage material. Therefore, the amplitude of A/F ratio lambda is reduced to a significantly lower value.

Air to Fuel Perturbations

FIGS. 5A and 5B illustrate lambda oscillation waveforms of the A/F perturbations of a SPGM TWC system at specific points prior to the exhaust gas emissions entering a front spinel zone and then after the exhaust gas emissions leave the front spinel zone before reaching the standard PGM CCC, according to an embodiment.

In FIG. 5, FIGS. 5A and 5B illustrate the lambda oscillation waveforms 500 and 550 of the A/F perturbations at specific points prior to the exhaust gas emissions entering (FIG. 5A) a front spinel zone and then after the exhaust gas emissions leave the front spinel zone (FIG. 5B) before reaching the standard PGM CCC, according to an embodiment.

FIG. 5A is a graphical representation illustrating lambda oscillation waveforms 502 of the A/F perturbations at point Q 402 of the exemplary SPGM TWC system of FIG. 4 prior to the exhaust gas emissions from engine 104 entering front spinel zone 202, according to an embodiment. In FIG. 5A, the y-axis represents the amplitude value of the lambda oscillation ($\lambda_Q$) normalized to a value of 1 at the origin and the x-axis represents the frequency of the lambda oscillation.

FIG. 5B is a graphical representation illustrating lambda oscillation waveforms 504 of the A/F perturbations at point R 404 of the exemplary SPGM TWC system of FIG. 4 prior to the exhaust gas emissions from engine 104 entering front spinel zone 202, according to an embodiment. In FIG. 5B, the y-axis represents the amplitude value of the lambda oscillation ($\lambda_R$) normalized to a value of 1 at the origin and the x-axis represents the frequency of the lambda oscillation.

Because of the significantly high oxygen storage capacity of the metal oxide material(s) within front spinel zone 202, when exhaust gases pass through front spinel zone 202 the lambda oscillation waveforms 502 of FIG. 5A are attenuated to a level of amplitude $\lambda_R$, having low frequencies, at analysis point R 404 before reaching standard PGM CCC 102, as illustrated in lambda oscillation waveforms 504 of FIG. 5B.

Because $\lambda_R$ is much lower than $\lambda_Q$, the catalytic conversion efficiency of the disclosed TWC system is enhanced when the A/F ratio oscillations caused by the perturbations are maintained at very low amplitude near the stoichiometric point during operation under lean and rich conditions.

Material Composition and Preparation of Samples for Variations of the TWC System Configuration The synergistic effects and catalytic conversion efficiency of TWC systems, such as, for example the TWC systems as described in FIGS. 2 and 3 vary based on the combination of the PGM loadings of the standard PGM CCC and the particular SPGM catalyst configuration. For the assessment of the TWC systems in the present disclosure, conventional chemical techniques, deposition methods, and treatment systems can be employed in order to form the disclosed TWC system samples.

In some embodiments, TWC system samples are produced using variations of PGM loadings for the standard PGM CCC as well as various SPGM catalyst configurations. In these embodiments, the TWC system samples include combinations of PGM material compositions of palladium (Pd) and rhodium (Rh). In other embodiments, the TWC system samples include combinations of PGM material compositions of Pd. According to these embodiments, the standard PGM CCC within the disclosed TWC systems can be configured to include at least a layer of PGM catalyst material overlying a Ce-based oxygen storage material substrate.

In some embodiments, the plurality of catalyst samples produced includes standard PGM CCC samples including loadings of about 6 g/ft$^3$ of Pd and of about 6 g/ft$^3$ of Rh; standard PGM CCC samples including loadings of about 12 g/ft$^3$ of Pd and of about 6 g/ft$^3$ of Rh; and standard PGM CCC samples including loading of about 20 g/ft$^3$ of Pd.

In some exemplary embodiments and referring to FIGS. 2 and 3, the Cu—Mn spinel is coated on standard PGM CCC. In these exemplary embodiments, TWC system samples are produced to include for each of the PGM loadings described above and used for the standard PGM CCC samples. Further to these embodiments, weight ratios of 60% Cu—Mn spinel with 40% PGM CCC are used, herein referred to as SPGM systems Type 1A, Type 2A, and Type 3A, respectively.

In other exemplary embodiments, TWC system samples are produced to include for each of the PGM loadings described above and used for the standard PGM CCC samples. Further to these exemplary embodiments, weight ratios of 40% Cu—Mn spinel with 60% PGM CCC are used, herein referred to as SPGM systems Type 1B, Type 2B, and Type 3B, respectively.

In some embodiments, reference samples are produced for catalytic conversion comparisons and to ascertain the significant catalytic conversion efficiency of disclosed TWC system configurations. In these embodiments, the reference samples produced include sample configurations of 60% by weight of a front zone having no spinel material (blank front zone) and 40% by weight of standard PGM CCC sample comprising the plurality of PGM loadings previously described. These samples are herein referred to as standard PGM CCC reference samples Type 1C, Type 2C, and Type 3C, respectively.

In other embodiments, the reference samples produced include sample configurations of 40% by weight of a blank front zone and 60% by weight of standard PGM CCC sample comprising the plurality of PGM loadings previously described. These samples are herein referred to as standard PGM CCC reference samples Type 1D, Type 2D, and Type 3D, respectively.

In still other embodiments, the reference samples prepared include samples including 100% by weight of standard PGM CCC sample, comprising the plurality of PGM loadings previously described. These samples are herein referred to as standard PGM CCC reference samples Type 1E, Type 2E, and Type 3E, respectively.

In other exemplary embodiments, reference samples are produced to include a 100% Cu—Mn spinel, herein referred to as ZPGM reference samples.

According to some embodiments, the synergistic effect of the front spinel zone and the catalytic performance of the disclosed catalyst systems can be tested and compared for all variations of the prepared samples. In these embodiments, testing is conducted by performing a series of isothermal oscillating tests by employing a simulated TWC exhaust gas composition fed into a flow reactor at a selected isothermal temperature and frequency, using a suitable A/F ratio span and space velocity.

TWC Isothermal Oscillating Test Procedure

According to embodiments, the TWC isothermal oscillating testing is conducted employing a flow reactor. During the testing, the temperature is increase from about 100° C. to about 500° C. at a rate of about 40° C./min. In some embodiments, a gas composition of 8,000 ppm of CO, 400 ppm of $C_3H_6$, 100 ppm of $C_3H_8$, 1,000 ppm of $NO_R$, 2,000 ppm of $H_2$, 10% of $CO_2$, 10% of $H_2O$, and $O_2$ oscillating between about 0.3% to about 0.45% by volume is fed into the flow reactor. In these embodiments, temperature within the flow reactor and the gas composition represent the three-way condition of the control loop in an exhaust system, where the air-fuel ratio (A/F) oscillates between rich and lean conditions of about four seconds each, respectively. The average R-value is about 1.05, at space velocity of about 40,000 h$^{-1}$. The TWC isothermal oscillating test is conducted, under a frequency of about 0.125 Hz, with ±0.8 A/F ratio span, and at an inlet temperature of about 550° C.

Figure 6:
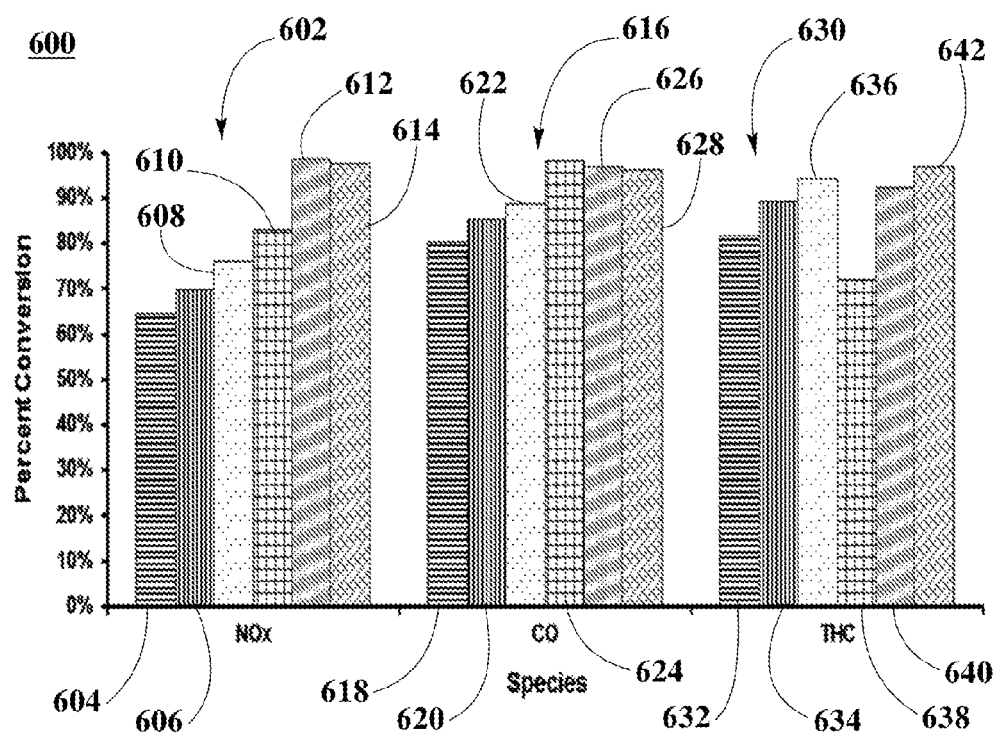
FIG. 6 is a graphical representation illustrating a catalytic conversion efficiency comparison of $NO_X$, CO, and THC conversions of an SPGM system resulting from isothermal oscillating testing of a first PGM loading of the standard PGM CCC as part of a plurality of SPGM catalyst configurations, according to an embodiment.

Catalytic Conversion Efficiency of a Close-Coupled Catalyst with a Front Spinel Zone FIG. 6 is a graphical representation illustrating a catalytic conversion efficiency comparison of $NO_X$, CO, and THC conversions of an SPGM system resulting from isothermal oscillating testing of a first PGM loading of the standard PGM CCC as part of a plurality of SPGM catalyst configurations, according to an embodiment.

In some embodiments, the plurality of system samples include SPGM system samples Type 1A and Type 1B, standard PGM CCC reference samples Type 1C, 1D, and 1E, and ZPGM reference samples, as detailed in Table 1 below.

TABLE 1

% $NO_X$, CO, and THC conversions for each of the samples tested including PGM loadings of 6 g/ft$^3$ Pd and 6 g/ft$^3$ Rh.

| Type of Sample | Pollutant | % Conversion | Associated Element |
|---|---|---|---|
| CCC reference sample Type 1C | $NO_X$ | 64 | 604 |
| CCC reference sample Type 1D | $NO_X$ | 70 | 606 |
| CCC reference sample Type 1E | $NO_X$ | 76 | 608 |
| ZPGM reference sample | $NO_X$ | 83 | 610 |
| SPGM system Type 1A | $NO_X$ | 99 | 612 |
| SPGM system Type 1B | $NO_X$ | 98 | 614 |
| CCC reference sample Type 1C | CO | 81 | 618 |
| CCC reference sample Type 1D | CO | 86 | 620 |
| CCC reference sample Type 1E | CO | 89 | 622 |
| ZPGM reference sample | CO | 98 | 624 |
| SPGM system Type 1A | CO | 97 | 626 |
| SPGM system Type 1B | CO | 96 | 628 |
| CCC reference sample Type 1C | THC | 82 | 632 |
| CCC reference sample Type 1D | THC | 89 | 634 |
| CCC reference sample Type 1E | THC | 94 | 636 |
| ZPGM reference sample | THC | 72 | 638 |
| SPGM system Type 1A | THC | 92 | 640 |
| SPGM system Type 1B | THC | 97 | 642 |

In FIG. 6, conversion comparison bar 602, conversion comparison bar 616, and conversion comparison bar 630 illustrate $NO_X$, CO, and THC conversions respectively, for the catalyst samples detailed in Table 1.

In FIG. 6, as can be observed from each of the conversion comparison bars for the associated TWC systems, described in FIGS. 2 and 3, the SPGM systems Type 1A and SPGM systems Type 1B exhibit significant levels of catalytic conversion efficiency. SPGM system Type 1A exhibits 99% $NO_X$ conversion (bar 612), 97% CO conversion (bar 626), and 92% THC conversion (bar 640). SPGM system Type 1B exhibits 98% $NO_X$ conversion (bar 614), 96% CO conversion (bar 628), and 97% THC conversion (bar 642).

When these conversion efficiencies are compared to results from other samples, it is observed that a characteristic selectivity for conversion of specific species of pollutants (i.e., $NO_X$, CO, and THC) is obtained. This characteristic selectivity for conversion of specific species is also observed for ZPGM reference samples, as illustrated in bar 610 (exhibits a $NO_X$ conversion of 83%) and in bar 624 (exhibits a CO conversion of 98%).

The standard PGM CCC reference samples Type 1E exhibit $NO_X$ conversion of 76%, CO conversion of 89%, and THC conversion of 94%, respectively, as illustrated in bar 608, bar 622, and bar 636 of FIG. 6.

These significant conversion efficiencies confirm the cooperative behavior between the front spinel zone of Cu—Mn spinel and the standard PGM CCC in the disclosed TWC system configurations. The thermal oscillating test confirms that SPGM system Type 1B can provide higher catalytic conversion efficiency than SPGM system Type 1A.

Figure 7:
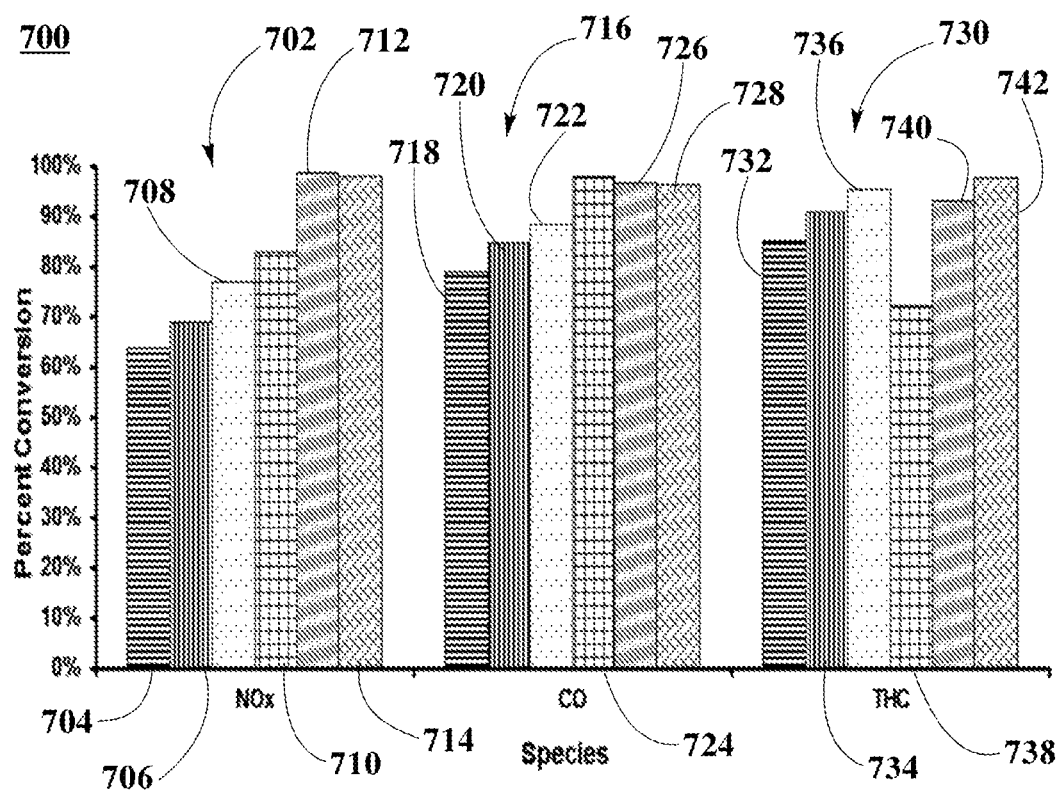
FIG. 7 is a graphical representation illustrating a catalytic conversion efficiency comparison of $NO_X$, CO, and THC conversions of an SPGM system resulting from isothermal oscillating testing of a second PGM loading of the standard PGM CCC as part of a plurality of SPGM catalyst configurations, according to an embodiment.

FIG. 7 is a graphical representation illustrating a catalytic conversion efficiency comparison of $NO_X$, CO, and THC conversions of an SPGM system resulting from isothermal oscillating testing of a second PGM loading of the standard PGM CCC as part of a plurality of SPGM catalyst configurations, according to an embodiment.

In this embodiment, the plurality of system samples includes SPGM system samples Type 2A and Type 2B, standard PGM CCC reference samples Type 2C, 2D, and 2E, and ZPGM reference samples, as detailed in Table 2 below.

TABLE 2

% $NO_X$, CO, and THC conversions for each of the samples tested including PGM loadings of 12 g/ft³ Pd and 6 g/ft³ Rh.

| Type of Sample | Pollutant | % Conversion | Associated Element |
|---|---|---|---|
| CCC reference sample Type, 2C | $NO_X$ | 64 | 704 |
| CCC reference sample Type 2D | $NO_X$ | 69 | 706 |
| CCC reference sample Type 2E | $NO_X$ | 77 | 708 |
| ZPGM reference sample | $NO_X$ | 83 | 710 |
| SPGM system Type 2A | $NO_X$ | 99 | 712 |
| SPGM system Type 2B | $NO_X$ | 98 | 714 |
| CCC reference sample Type 2C | CO | 79 | 718 |
| CCC reference sample Type 2D | CO | 85 | 720 |
| CCC reference sample Type 2E | CO | 89 | 722 |
| ZPGM reference sample | CO | 98 | 724 |
| SPGM system Type 2A | CO | 97 | 726 |
| SPGM system Type 2B | CO | 97 | 728 |
| CCC reference sample Type 2C | THC | 85 | 732 |
| CCC reference sample Type 2D | THC | 91 | 734 |
| CCC reference sample Type 2E | THC | 95 | 736 |
| ZPGM reference sample | THC | 72 | 738 |
| SPGM system Type 2A | THC | 93 | 740 |
| SPGM system Type 2B | THC | 98 | 742 |

In FIG. 7, conversion comparison bar 702, conversion comparison bar 716, and conversion comparison bar 730 illustrate $NO_X$, CO, and THC conversions respectively, for the catalyst samples detailed in Table 2.

In FIG. 7, as can be observed from each of the conversion comparison bars for the associated TWC systems, described in FIGS. 2 and 3, the SPGM systems Type 2A and SPGM systems Type 2B exhibit significant levels of catalytic conversion efficiency. SPGM system Type 2A exhibits 99% $NO_X$ conversion (bar 712), 97% CO conversion (bar 726), and 93% THC conversion (bar 740). SPGM system Type 2B exhibits 98% $NO_X$ conversion (bar 714), 97% CO conversion (bar 728), and 98% THC conversion (bar 742).

When these conversion efficiencies are compared to results from other samples, it is observed that a characteristic selectivity for conversion of specific species of pollutants is obtained. This characteristic selectivity for conversion of specific species is also observed for ZPGM reference samples, as illustrated in bar 710 (exhibits a $NO_X$ conversion of 83%) and in bar 724 (exhibits a CO conversion of 98%).

The standard PGM CCC reference samples Type 2E exhibit $NO_X$ conversion of 77%, CO conversion of 89%, and THC conversion of 95%, respectively, as illustrated in bar 708, bar 722, and bar 736 of FIG. 7.

These significant conversion efficiencies confirm the cooperative behavior between the front spinel zone of Cu—Mn spinel and the standard PGM CCC in the disclosed TWC system configurations. The thermal oscillating test confirms that SPGM system Type 2B can provide higher catalytic conversion efficiency than SPGM system Type 2A.

Figure 8:
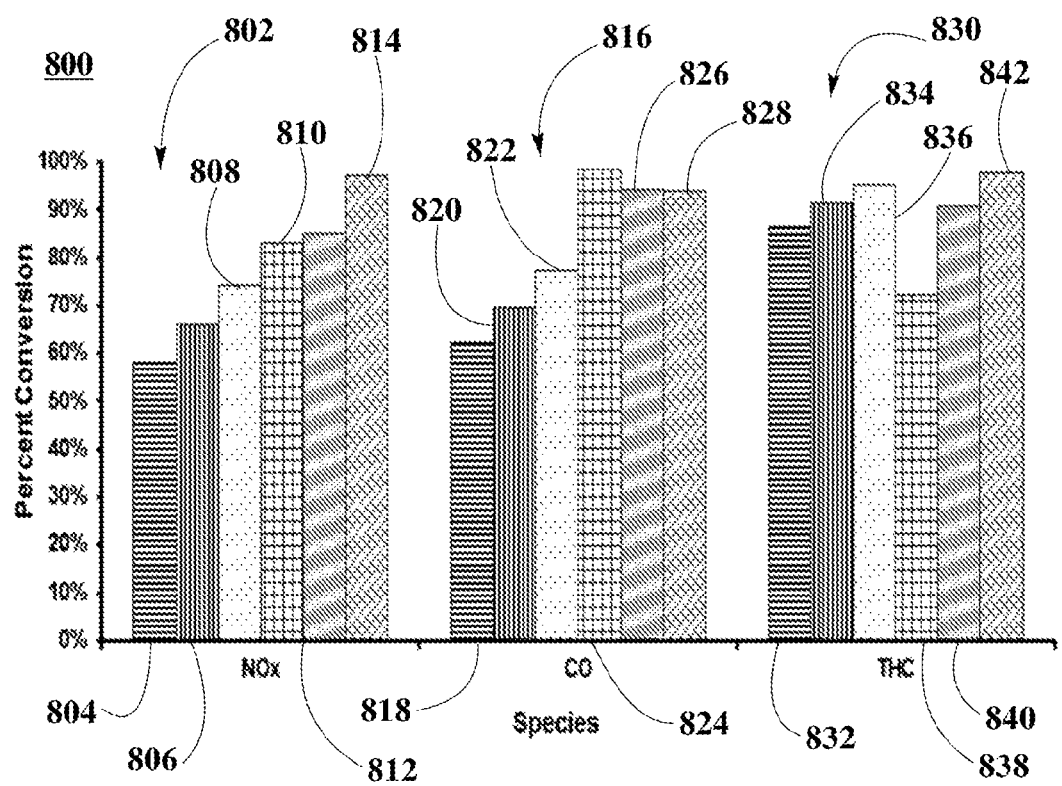
FIG. 8 is a graphical representation illustrating a catalytic conversion efficiency comparison of $NO_X$, CO, and THC conversions of an SPGM system resulting from isothermal oscillating testing of a third PGM loading of the standard PGM CCC as part of a plurality of SPGM catalyst configurations, according to an embodiment.

FIG. 8 is a graphical representation illustrating a catalytic conversion efficiency comparison of $NO_X$, CO, and THC conversions of an SPGM system resulting from isothermal oscillating testing of a third PGM loading of the standard PGM CCC as part of a plurality of SPGM catalyst configurations, according to an embodiment.

In this embodiment, the plurality of system samples includes SPGM system samples Type 3A and Type 3B, CCC reference samples Type 3C, 3D, and 3E, and ZPGM reference samples, as detailed in Table 3 below.

TABLE 3

% $NO_X$, CO, and THC conversions for each of the samples tested including PGM loadings of 20 g/ft³ Pd.

| Type of Sample | Pollutant | % Conversion | Associated Element |
|---|---|---|---|
| CCC reference sample Type 3C | $NO_X$ | 58 | 804 |
| CCC reference sample Type 3D | $NO_X$ | 66 | 806 |
| CCC reference sample Type 3E | $NO_X$ | 74 | 808 |
| ZPGM reference sample | $NO_X$ | 83 | 810 |
| SPGM system Type 3A | $NO_X$ | 85 | 812 |
| SPGM system Type 3B | $NO_X$ | 97 | 814 |
| CCC reference sample Type 3C | CO | 62 | 818 |
| CCC reference sample Type 3D | CO | 70 | 820 |
| CCC reference sample Type 3E | CO | 77 | 822 |
| ZPGM reference sample | CO | 98 | 824 |
| SPGM system Type 3A | CO | 94 | 826 |
| SPGM system Type 3B | CO | 94 | 828 |
| CCC reference sample Type 3C | THC | 87 | 832 |
| CCC reference sample Type 3D | THC | 91 | 834 |
| CCC reference sample Type 3E | THC | 95 | 836 |
| ZPGM reference sample | THC | 72 | 838 |
| SPGM system Type 3A | THC | 91 | 840 |
| SPGM system Type 3B | THC | 98 | 842 |

In FIG. 8, conversion comparison bar 802, conversion comparison bar 816, and conversion comparison bar 830 illustrate $NO_X$, CO, and THC conversions respectively, for the catalyst samples detailed in Table 3.

In FIG. 8, as can be observed from each of the conversion comparison bars for the associated TWC systems, described in FIGS. 2 and 3, the SPGM systems Type 3A and SPGM systems Type 3B exhibit significant levels of catalytic conversion efficiency. SPGM system Type 3A exhibits 85% $NO_X$ conversion (bar 812), 94% CO conversion (bar 826), and 91% THC conversion (bar 840). SPGM system Type 3B exhibits 97% $NO_X$ conversion (bar 814), 94% CO conversion (bar 828), and 98% THC conversion (bar 842).

When these conversion efficiencies are compared to results from other samples, it is observed that a characteristic selectivity for conversion of specific species of pollutants is obtained. This characteristic selectivity for conversion of specific species is also observed for ZPGM reference samples, as illustrated in bar 810 (exhibits a $NO_X$ conversion of 83%) and in bar 824 (exhibits a CO conversion of 98%).

The standard PGM CCC reference samples Type 3E exhibit $NO_X$ conversion of 74%, CO conversion of 77%, and THC conversion of 95%, respectively, as illustrated in bar 808, bar 822, and bar 836 of FIG. 8.

These significant conversion efficiencies confirm the cooperative behavior between front spinel zone of Cu—Mn spinel and the standard PGM CCC in the disclosed TWC system configurations. The thermal oscillating test confirms SPGM system Type 3B can provide higher catalytic conversion efficiency than SPGM system Type 3A.

When all types of SPGM system samples are compared for catalytic conversion efficiency, in FIGS. 6-8 can be observed that the most significant system performance is provided by the SPGM systems Type 2A and Type 2B, followed by the SPGM systems Type 1A and Type 1B, and subsequently, the SPGM systems Type 3A and Type 3B. However, depending on design factors of an exhaust system, all the disclosed SPGM systems can be utilized for different TWC applications because of the significant conversion efficiencies that resulted from the TWC isothermal oscillating tests performed on the plurality of SPGM system samples.

Depending on the desired level of conversion of the TWC system including the synergized PGM CCC configurations disclosed, the underfloor or clean-up PGM-based catalyst can be included as a component of the intended exhaust system. However, the enhanced and significant catalytic conversion efficiency of the disclosed SPGM system configurations and the provided attenuation of the A/F perturbations enable the removal of the conventional underfloor or clean-up PGM-based catalyst used in current TWC systems.

Figure 9:
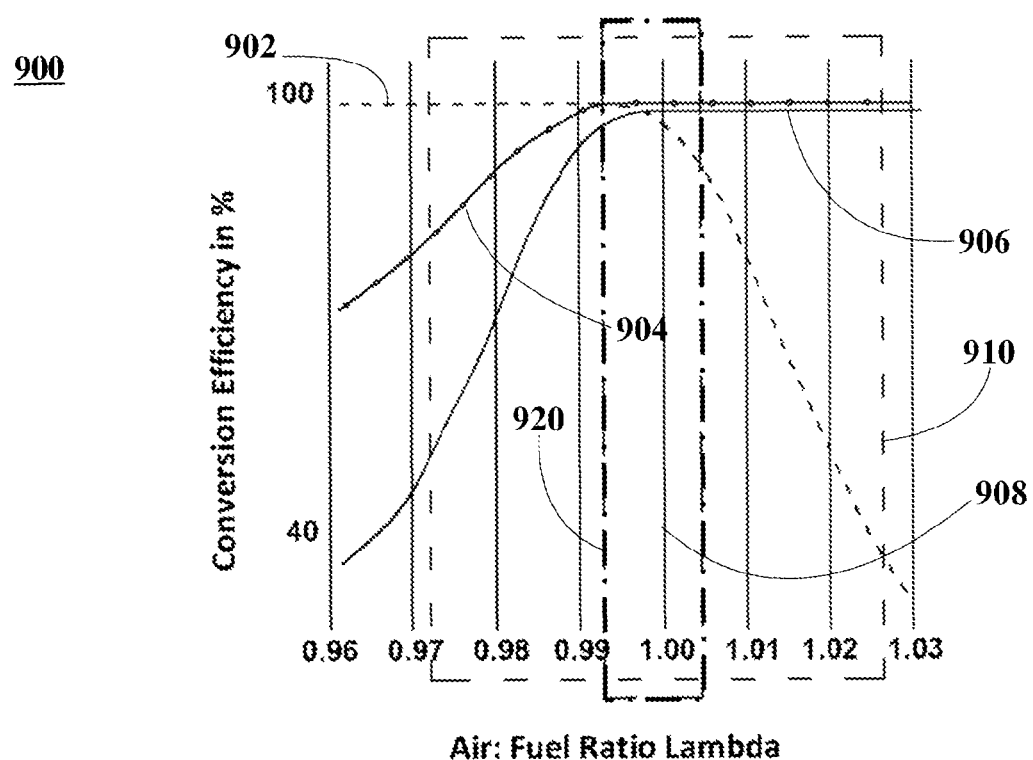
FIG. 9 is a graphical representation illustrating lambda oscillation zones which characterize the catalytic conversion from conventional TWC systems and the disclosed SPGM TWC systems, according to an embodiment.

FIG. 9 is a graphical representation illustrating lambda oscillation zones which characterize the catalytic conversion from conventional TWC systems and disclosed SPGM TWC systems, according to an embodiment.

In FIG. 9, conversion curve 902 represents $NO_X$ conversion, conversion curve 904 represents for HC conversion, and conversion curve 906 represents CO conversion for a TWC system configuration, such as, for example the configuration of TWC system 100, as described in FIG. 1.

In some embodiments, the system operates within A/F ratio lambda zone 910, where A/F perturbations are high as a result of the wide range of A/F ratio around the stoichiometric point marked by line 908. As observed in conversion curve 902, the catalytic performance in $NO_X$ conversion remains at about 100% conversion for lean conditions, at the R value range between about 0.96 and less than about 0.99. In these embodiments, the $NO_X$ conversion declines to about 40% or less for rich conditions at R values greater than about 1.005 close to stoichiometric to R values less than about 1.03.

In FIG. 9, A/F ratio lambda zone 920 indicates the operation of disclosed SPGM TWC system configurations, as described in FIGS. 2 and 3. In this zone, catalytic performance in $NO_X$ conversion, HC conversion, and CO conversion is significantly high and stable, at R values very close to the stoichiometric point for both lean and rich conditions. The range of R values for operation within this zone is greater than about 0.99 and less than about 1.005. When the disclosed TWC system configuration operates within A/F ratio lambda zone 920, the systems provide attenuated A/F perturbations and thermal stability given the synergistic effects of the Cu—Mn spinel in the front spinel zone and the cooperative behavior developed in conjunction with the standard PGM CCC.

As observed in $NO_X$ conversion curve 902, HC conversion curve 904, and CO conversion curve 906, the operation of disclosed SPGM TWC systems within A/F ratio lambda zone 920 results in significantly high catalytic conversion efficiency. The high catalytic conversion efficiency is confirmed by results in FIGS. 6-8.

The present disclosure confirms that PGM catalysts alone and ZPGM catalysts of binary spinel alone may not provide significantly high catalytic conversion efficiency as can be provided by the disclosed SPGM systems, which include a synergized standard PGM CCC with a front spinel zone. The disclosed SPGM systems for TWC applications are catalyst systems of significantly high catalytic conversion efficiency and attenuated A/F perturbations.

While various aspects and embodiments have been disclosed, other aspects and embodiments may be contemplated. The various aspects and embodiments disclosed here are for purposes of illustration and are not intended to be limiting, with the true scope and spirit being indicated by the following claims.

What is claimed is:

1. A catalytic system, comprising:
a first catalytic apparatus comprising at least two catalytic portions; and
a second catalytic apparatus comprising at least one catalytic portion;
wherein one of the at least two catalytic portions of the first catalytic apparatus comprises at least one binary spinel composition and wherein one of the at least two catalytic portions of the first catalytic apparatus comprises a close-coupled catalyst; and
wherein the at least one catalytic portion of the second catalytic apparatus comprises a platinum group metal.

2. The catalytic system of claim 1, wherein the second catalytic apparatus forms a portion of an automotive underfloor catalyst.

3. The catalytic system of claim 1, wherein the at least one binary spinel composition is formed from metals selected from the group consisting of aluminum, magnesium, manganese, gallium, nickel, copper, silver, cobalt, iron, chromium, titanium, tin, and mixtures thereof.

4. The catalytic system of claim 1, wherein the at least one binary spinel composition comprises a Cu—Mn spinel structure.

5. The catalytic system of claim 1, wherein at least one of the at least two catalytic portions of the first catalytic apparatus comprises a substrate having disposed thereto a catalyst at a thickness of between one and two inches.

6. The catalytic system of claim 1, wherein the conversion of CO in an applied lean exhaust stream is greater than 95%.

7. The catalytic system of claim 1, wherein the conversion of NO in an applied lean exhaust stream is greater than 98%.

8. The catalytic system of claim 1, wherein the conversion of hydrocarbons in an applied lean exhaust stream is greater than 96%.

9. The catalytic system of claim 1, wherein the close-coupled catalyst comprises Pd and Rh.

10. The catalytic system of claim 1, wherein the close-coupled catalyst comprises Pd and Rh; wherein the Pd is present at about between 6 $g/ft^3$ and 20 $g/ft^3$, and the Rh is present at about 6 $g/ft^3$.

11. The catalytic system of claim 1, wherein the close-coupled catalyst comprises about 60% by weight of Cu—Mn spinel.

12. The catalytic system of claim 1, wherein the close-coupled catalyst comprises about 40% by weight of a platinum group metal.

13. The catalytic system of claim 1, wherein the close-coupled catalyst comprises at least a layer of PGM catalyst material overlying a Ce-based oxygen storage material substrate.

* * * * *

UNITED STATES PATENT AND TRADEMARK OFFICE
CERTIFICATE OF CORRECTION

PATENT NO. : 9,700,841 B2  
APPLICATION NO. : 14/657842  
DATED : July 11, 2017  
INVENTOR(S) : Golden Page 1 of 1

It is certified that error appears in the above-identified patent and that said Letters Patent is hereby corrected as shown below:

On the Title Page (73):  
"BYD Company Limited, Shenzhen (CN)" should read --Clean Diesel Technologies, Inc., Oxnard, CA (US)--.

In the Claims

Column 14,  
Line 52, "NO" should read --$NO_x$--.

Signed and Sealed this  
Twenty-fourth Day of October, 2017

Joseph Matal  
*Performing the Functions and Duties of the*  
*Under Secretary of Commerce for Intellectual Property and*  
*Director of the United States Patent and Trademark Office*